United States Patent
Corghi (10) Patent No.: US 10,006,830 B2
(45) Date of Patent: Jun. 26, 2018

(54) BALANCING MACHINE

(71) Applicant: CORGHI S.p.A., Correggio (Reggio Emilia) (IT)

(72) Inventor: Giulio Corghi, Correggio (IT)

(73) Assignee: NEXION S.P.A., Correggio (Reggio Emilia) (IT)

(*) Notice: Subject to any disclaimer, the term of this patent is extended or adjusted under 35 U.S.C. 154(b) by 292 days.

(21) Appl. No.: 15/153,539

(22) Filed: May 12, 2016

(65) Prior Publication Data
US 2016/0341624 A1    Nov. 24, 2016

(51) Int. Cl.
G01M 17/02    (2006.01)
G01M 1/04    (2006.01)

(52) U.S. Cl.
CPC .......... G01M 1/045 (2013.01); G01M 17/021 (2013.01)

(58) Field of Classification Search
None
See application file for complete search history.

(56) References Cited

U.S. PATENT DOCUMENTS

| | | | |
|---|---|---|---|
| 3,683,981 A * | 8/1972 | Branick | G01M 17/021 157/16 |
| 4,202,213 A * | 5/1980 | Toriselli | G01M 1/045 73/487 |
| 5,257,561 A * | 11/1993 | Folta | G01M 17/021 157/14 |
| 5,703,291 A * | 12/1997 | Rossteuscher | G01M 1/045 73/487 |
| 6,074,118 A | 6/2000 | Ferrari et al. | |
| 6,516,855 B2 * | 2/2003 | Corghi | B60C 25/0545 157/1.1 |

(Continued)

FOREIGN PATENT DOCUMENTS

| | | |
|---|---|---|
| DE | 4000424 A1 | 7/1991 |
| EP | 1 811 279 B1 | 7/2007 |

(Continued)

OTHER PUBLICATIONS

Italian Search Report (ITUB20150664); Date of Completion: Jan. 22, 2016.

*Primary Examiner* — Jill Culler
(74) *Attorney, Agent, or Firm* — Howard & Howard Attorneys PLLC (57) ABSTRACT

A wheel service machine for a wheel having a rim and a tire includes a motor-driven shaft for supporting the wheel in rotation. The machine includes an abutment element integral with the shaft, a locking member for locking the rim against the abutment element, an engagement element movable to drive the locking member towards the abutment element, and a pneumatic actuator having a first and a second chamber rotating with the shaft and connected to the engagement element to move the engagement element automatically. The machine also includes a high-pressure source, a pneumatic circuit to selectively connect the first and second chambers of the actuator to the high-pressure source. The pneumatic circuit includes a rotary manifold having a first and a second duct, and a retaining valve configured to determine a difference in pressure between the second chamber of the pneumatic actuator and the second duct of the rotary manifold.

13 Claims, 5 Drawing Sheets

(56) References Cited

U.S. PATENT DOCUMENTS

| | | | |
|---|---|---|---|
| 6,763,715 B2* | 7/2004 | Corghi | G01M 1/045 |
| | | | 73/487 |
| 7,150,291 B2 | 12/2006 | Ferrari et al. | |
| 7,900,511 B2 | 3/2011 | Silvano et al. | |
| 7,987,889 B1* | 8/2011 | Story | B60C 25/0545 |
| | | | 157/14 |
| 2015/0114110 A1* | 4/2015 | Marler | G01M 17/013 |
| | | | 73/460 |

FOREIGN PATENT DOCUMENTS

| IT | 4684177 A | 3/1977 |
|---|---|---|
| IT | 1072196 B | 4/1985 |
| IT | RE1987U34878 B | 9/1987 |

* cited by examiner

BALANCING MACHINE

CROSS-REFERENCE TO RELATED APPLICATION

This application claims the benefit of IT Patent Application No. 102015000016110, filed May 20, 2015, the disclosure of which is hereby incorporated by reference in its entirety.

BACKGROUND OF THE INVENTION

This invention relates to a balancing machine and, more generally, to a wheel service machine and to a method for using the same. A wheel service machine is a balancing machine or a tire changer machine.

The invention applies in general to the field of equipment for tire service specialists and in particular to that of balancing machines.

The balancing of a vehicle wheel is performed by the tire service specialist in order to eliminate or minimize the effects of the asymmetric distribution of the weights of the tire/rim assembly. These asymmetries are usually compensated for by the tire service specialist by fixing counterweights to the rim.

Balancing machines measure the wheel unbalance by analyzing the timing and amplitude of the mechanical vibrations which are generated by rotating the wheel. The mechanical vibrations are measured in terms of movements, forces or pressures, by using transducers which convert the measurements collected into electrical signals.

Balancing machines indicate to the user the weight and the position on the rim at which to fix the counterweights.

More generally speaking, it should be noted that wheel service machines, balancing machines and tire changers, comprise a wheel-holder unit, having a motor-driven supporting shaft (or spindle) configured to set in rotation a wheel (or a rim) about an axis of rotation. These machine also comprise a locking device configured to fix the wheel (that is, the rim) to the supporting shaft and allow it to rotate as one therewith, preventing relative movements between the wheel and the wheel-holder unit which might invalidate the result of the measurement or cause damage to the machine or wheel.

Known in the state of the art are locking devices comprising electrical actuating means. These electrical locking devices, however, are very expensive and not very reliable on account of their sliding contacts.

Thus, pneumatic actuators are often used to lock the wheel in place. This invention relates in particular to a wheel service machine of this kind, which uses a pneumatic or hydraulic actuator, integral with the rotary shaft, to drive an automatic wheel locking device.

Examples of wheel balancing machines of this kind are described in patent documents DE4000424A1, EP1811279B1, IT1072196B, IT46841A77, RE1987U034878, U.S. Pat. No. 6,074,118A1, U.S. Pat. No. 7,150,291B2 and U.S. Pat. No. 7,900,511B2.

Typically, the actuator has a first chamber and a second chamber which are pressurized alternately in order to generate a pressure difference between one chamber and the other, thus moving a piston in two opposite directions.

To drive the piston, these pneumatic actuating means comprise, for example, a rotary joint (or rotatable fitting) connected to the cylinder and configured to transfer the pressurized fluid to the rotary cylinder.

In this context, one technical difficulty is due to the need to supply high pressure alternately through ducts which rotate as one with the shaft.

The solutions provided by the above mentioned documents tackle this problem but have two main difficulties: they give rise to vibrations which create the risk of invalidating measurement precision and they limit the reliability of the machine.

Also known, in the context of pneumatic circuits designed to supply rotationally driven elements, are rotary manifolds, or rotary joints, having one or more ducts extending between two manifold portions in relative rotational motion. Typically, rotary joints are equipped with seals which separate different pressure zones.

The application of a rotary joint effectively allows simplifying the pneumatic circuit of the machine but nevertheless involves some disadvantages.

The main disadvantage is due to the difficulty of combining the need to guarantee a good seal in the joint (suggesting the adoption of particularly robust and efficacious seals) with the need for device reliability (since efficacious seals tend to wear more quickly because they are subjected to greater stress during rotation of the joint) and damping of shaft vibrations.

SUMMARY OF THE INVENTION

This invention has for an aim to provide a wheel service machine and a method for using it which overcome the above mentioned disadvantages of the prior art.

Another aim of the invention is to provide a wheel service machine and a method of using it which are particularly robust and reliable.

A further aim of the invention is to provide a wheel service machine and a method of using it which are constructionally very simple and economical.

A further aim of the invention is to provide a wheel service machine which is limited in size.

These aims are fully achieved by the machine and method of this invention as characterized in the appended claims.

More specifically, the wheel service machine according to the invention comprises a shaft connected to a motor drive unit by which it is rotated about its longitudinal axis.

The shaft is rotatably connected to a frame and is designed to rotatably support the wheel. The shaft may be oriented horizontally, that is, parallel to a floor the machine rests on (for example, if it is a balancing machine or a tire changer machine for large wheels) but it may also be oriented vertically, that is perpendicular to the floor the machine rests on (for example, if it is a tire changer machine for relatively small wheels).

The machine comprises an abutment element, connected to the shaft to rotate as one therewith and designed to come into abutment with the rim when the latter is coupled to the shaft.

The machine also comprises a locking member designed to be removably coupled to the shaft and configured to slide longitudinally along the shaft. More specifically, the locking member is movable between a locked position, where it is close to the abutment element in order to lock the rim (interposed between the abutment element and the locking member itself) and an unlocked position, away from the abutment element and not interfering with the rim.

The machine of the invention has an automatic locking system for locking the wheel on the shaft. In effect, the machine comprises an engagement element which is movably connected to the shaft to move parallel with the longitudinal axis. The engagement element is configured to be coupled to the locking member so as to drive the latter in motion.

The engagement element is connected to a pneumatic (or hydraulic) actuator which causes it to move automatically. It should be noted that, hereinafter, direct reference is made to a pneumatic actuator, meaning by this that the features of this description apply both to a pneumatic actuator in the strict sense (where the fluid circulating in the pneumatic circuit is a gas) and to a hydraulic actuator (where the fluid circulating in the pneumatic, or hydraulic, circuit is a liquid such as, for example, an oil).

The pneumatic actuator is integral with the shaft during rotation of the shaft. The pneumatic actuator has a first and a second chamber. The first and second chambers are separated by a wall connected to a piston such that a pressure difference between the two chambers causes the wall, and thus, the piston, which is connected to the engagement element, to move.

To supply the pneumatic actuator, there is a source of high pressure connected to a pneumatic circuit.

The pneumatic circuit is configured to selectively connect the first and second chambers of the pneumatic actuator to the source of high pressure.

The pneumatic circuit includes a rotary manifold (or joint). The parts of the pneumatic circuit located downstream of the rotary manifold are integral with the shaft, that is to say, they are operatively rotating, while the parts of the pneumatic circuit located upstream of the rotary manifold are stationary. The high-pressure source is stationary. The pneumatic actuator is rotating.

The rotary manifold has a stationary part (upstream) and a rotating part (downstream). The rotary manifold defines at least a first and a second duct, each having an inlet in the stationary part and an outlet in the rotating part.

The outlet of the first duct of the rotary manifold is connected to the first chamber of the pneumatic actuator. The outlet of the second duct of the rotary manifold is connected to the second chamber of the pneumatic actuator.

The inlets of the first and second ducts can be connected selectively to the high-pressure source of a fluid (gas or liquid).

The pneumatic circuit comprises at least a first retaining valve located between the second chamber of the pneumatic actuator and the outlet of the second duct of the rotary manifold, in order to determine, in at least one operating configuration of the pneumatic circuit, a difference in pressure between the second chamber of the pneumatic actuator and the second duct of the rotary manifold.

This allows maintaining, inside the pneumatic actuator, a pressure difference corresponding to a locked position of the locking member (for example, with the pressure in the second chamber higher than in the first chamber) and, at the same time, allows balancing the pressure inside the ducts of the rotary manifold, for example setting them both at ambient pressure.

It is thus possible to have overpressure inside the rotary joint (thereby locking the wheel) while the joint rotates but without having overpressure in the rotary manifold during rotation. This reduces the stress on the seals of the rotary manifold because the pressure difference which causes the stress is present only when the manifold is stationary.

That makes the machine particularly reliable without diminishing the robustness and efficacy of the pneumatic system seal.

In an example embodiment, the retaining valve is a one-way lock valve.

The retaining valve has an inlet and an outlet. The retaining valve is open when the pressure at the inlet is higher than the pressure at the outlet and is normally closed when the pressure at the inlet is lower than the pressure at the outlet.

Preferably, the retaining valve can also be activated so it is forced to open by means of a specific activation duct. In other words, the retaining valve, besides having an inlet duct and an outlet duct, is connected to an activation duct. In that case, to force activation of the retaining valve, it is necessary to adjust the pressure in the activation duct. In another example, the retaining valve can be activated in controlled manner, that is, forcedly, by means of an electric signal.

In an example embodiment, the pneumatic circuit comprises a second retaining valve, located between the inlet of the first duct of the rotary manifold and an environment at low pressure such as, for example, the outside environment.

For example, the second retaining valve, like the first, is also a one-way lock valve.

In an example embodiment, the second retaining valve, too, can be forcedly actuated to open the duct in which it is mounted, for example by means of its own activation duct.

In an example embodiment, the duct of the first retaining valve is connected to the outlet of the first duct of the rotary manifold, while the activation duct of the second retaining valve is connected (or connectable) to the inlet of the second duct of the rotary manifold.

In an example embodiment, the pneumatic circuit comprises an electrovalve, connected upstream of the rotary manifold to the inlets of the circuit ducts. Thus, the electrovalve is stationary relative to the rotation of the shaft.

The electrovalve is operatively interposed between the high-pressure source and the inlets of the rotary manifold.

The electrovalve can be driven into at least three operating configurations.

In a first operating configuration, the electrovalve places in fluid communication the first duct of the rotary manifold with the low-pressure environment and the second duct of the rotary manifold with the high-pressure source.

In a second operating configuration, the electrovalve places in fluid communication the first duct of the rotary manifold with the high-pressure source and the second duct of the rotary manifold with the low-pressure environment.

In a third operating configuration, the electrovalve places the first and second ducts of the rotary manifold in fluid communication with the low-pressure environment.

In an example embodiment, the high-pressure source is located upstream of the electrovalve.

In an example embodiment, the second retaining valve is located upstream of the electrovalve.

In an example embodiment, the pneumatic circuit comprises a relief valve connected to the electrovalve (upstream thereof) and operatively in fluid communication with the first duct of the rotary manifold, when the electrovalve is in the third operating configuration.

The first retaining valve rotates as one with the shaft.

The first retaining valve has an outlet connected to the second chamber of the pneumatic actuator and an inlet connected, selectively and alternately, to the high-pressure source when the electrovalve is in the first operating configuration, and to the low-pressure environment when the electrovalve is in the second and third operating configurations.

The second retaining valve is stationary relative to the rotary shaft.

The second retaining valve has an inlet connected to the low-pressure environment and an outlet connected, selectively and alternately, to the first duct of the rotary manifold when the electrovalve is in the first and third operating configurations, and to the high-pressure source when the electrovalve is in the second operating configuration.

The invention also provides a method for using a wheel service machine to allow operations to be carried out on a wheel having a rim and a tire.

The operations are, for example, balancing the wheel (if the machine is a wheel balancing machine) or, if it is a tire changer machine, removing the tire from the rim or fitting the tire to the rim.

The method comprises the steps of mounting the rim on the shaft by inserting the free end of the shaft into the central hole in the rim until the rim abuts against an abutment element on the shaft; and then coupling a locking member to the shaft in such a way that the rim is interposed between the locking member and the abutment element.

The wheel is locked to the shaft automatically by moving the engagement element longitudinally along the shaft to engage the locking member and lock the rim against the abutment element.

The movement of the engagement element is determined by a pneumatic actuator operatively rotating as one with the shaft and connected to the rotary manifold, that is, to the rotary part of the rotary manifold itself, while the stationary part of the rotary manifold is integral with the frame or, more generally, to a machine part which is stationary relative to the rotation of the shaft.

The outlets of the first and the second duct of the rotary manifold are connected to the first and the second chamber of the pneumatic actuator, respectively. The inlets of the first and the second duct can be connected selectively to a source of high-pressure.

Once the wheel is locked in place, the shaft and the wheel locked thereto are set in rotation.

When operations on the wheel have been completed, the shaft is made to stop rotating.

Locking the wheel in turn comprises the following steps.

With the shaft stopped (stationary), that is to say, before the shaft is made to start rotating, the first and the second duct of the rotary manifold are placed in fluid communication with the low-pressure environment and with the high-pressure source, respectively, so as to create a condition of overpressure in the second chamber of the pneumatic actuator relative to the first chamber. This forces the locking member into the locked position.

Next, the second duct of the rotary manifold is connected to the low-pressure environment and the second chamber of the pneumatic actuator is kept under high pressure by means of the first retaining valve positioned between the second chamber of the pneumatic actuator and the outlet of the second duct of the rotary manifold.

After that, the shaft is made to start rotating. When rotation has stopped, there is a step of unlocking which comprises the following steps: connecting the first duct of the rotary manifold to the high-pressure source; connecting the second duct of the rotary manifold to the low-pressure environment; and activating the first retaining valve so it opens (forcedly, in the case of a one-way valve).

Preferably, the locking and unlocking steps comprise moving an electrovalve, which is operatively interposed between the inlets of the rotary manifold and the high-pressure source (and the low-pressure environment), between at least a first, a second and a third operating configuration.

The first operating configuration of the electrovalve corresponds to moving the pneumatic actuator to cause locking (that is, moving the locking member into the locked position). In the first operating configuration, the electrovalve places in fluid communication the first duct of the rotary manifold with the low-pressure environment and the second duct of the rotary manifold with the high-pressure source.

The second operating configuration of the electrovalve corresponds to moving the pneumatic actuator to cause unlocking (that is, moving the locking member into the unlocked position). In the second operating configuration, the electrovalve places in fluid communication the first duct of the rotary manifold with the high-pressure source and the second duct of the rotary manifold with the low-pressure environment.

The third operating configuration corresponds to a situation where the two circuits of the rotary manifold can be set to the same pressure while maintaining the overpressure inside the pneumatic actuator. In the third operating configuration, the electrovalve places the first and second ducts of the rotary manifold in fluid communication with the low-pressure environment.

The invention also provides a locking system for locking a wheel to a rotary shaft of a wheel service machine comprising the pneumatic circuit which is equipped with the rotary manifold and the pneumatic actuator.

The invention also provides a pneumatic (or hydraulic) circuit for locking a wheel to a rotary shaft in a wheel service machine.

BRIEF DESCRIPTION OF THE DRAWINGS

This and other features of the invention will become more apparent from the following detailed description of a non-limiting example embodiment, with reference to the accompanying drawings, in which.

DETAILED DESCRIPTION

Figure 1:
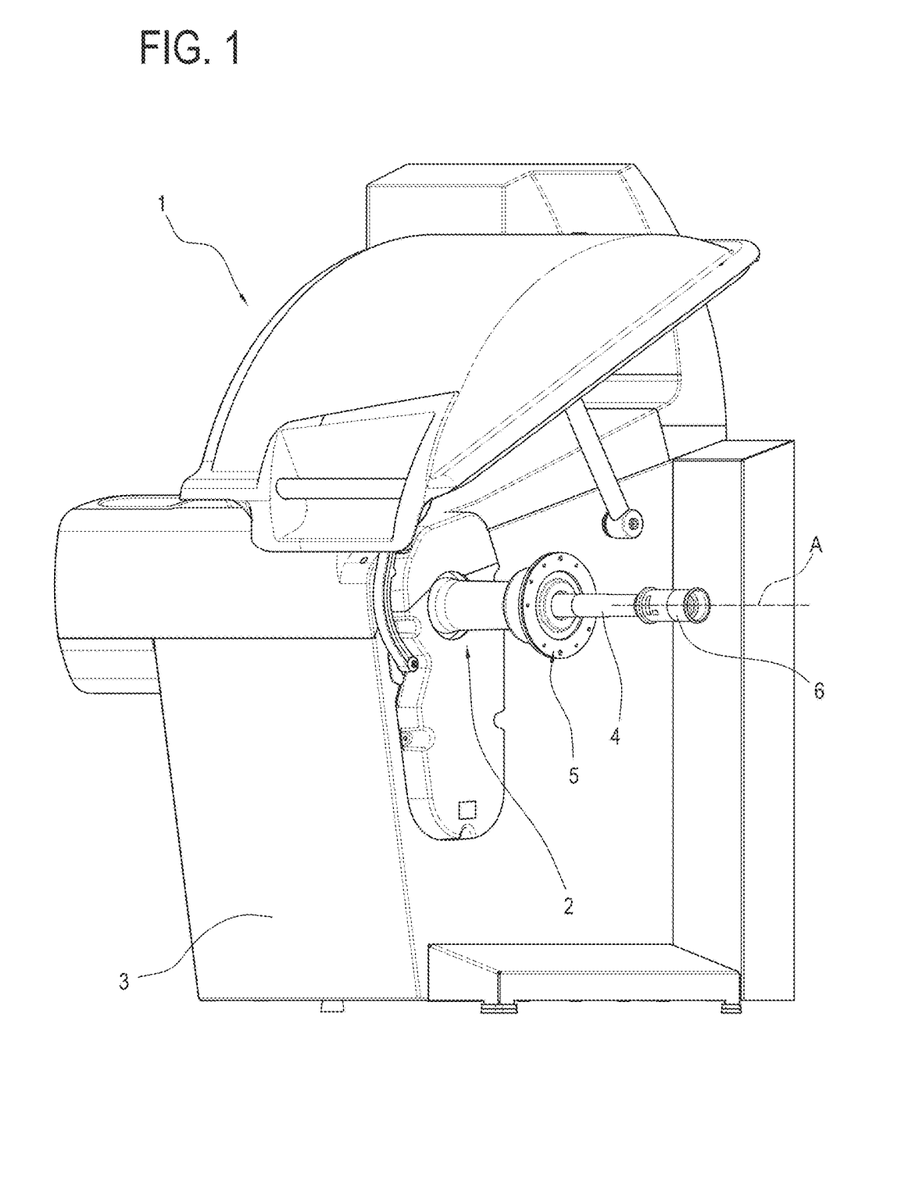
FIG. 1 illustrates a wheel service machine, and more specifically, a balancing machine.
Figure 2:
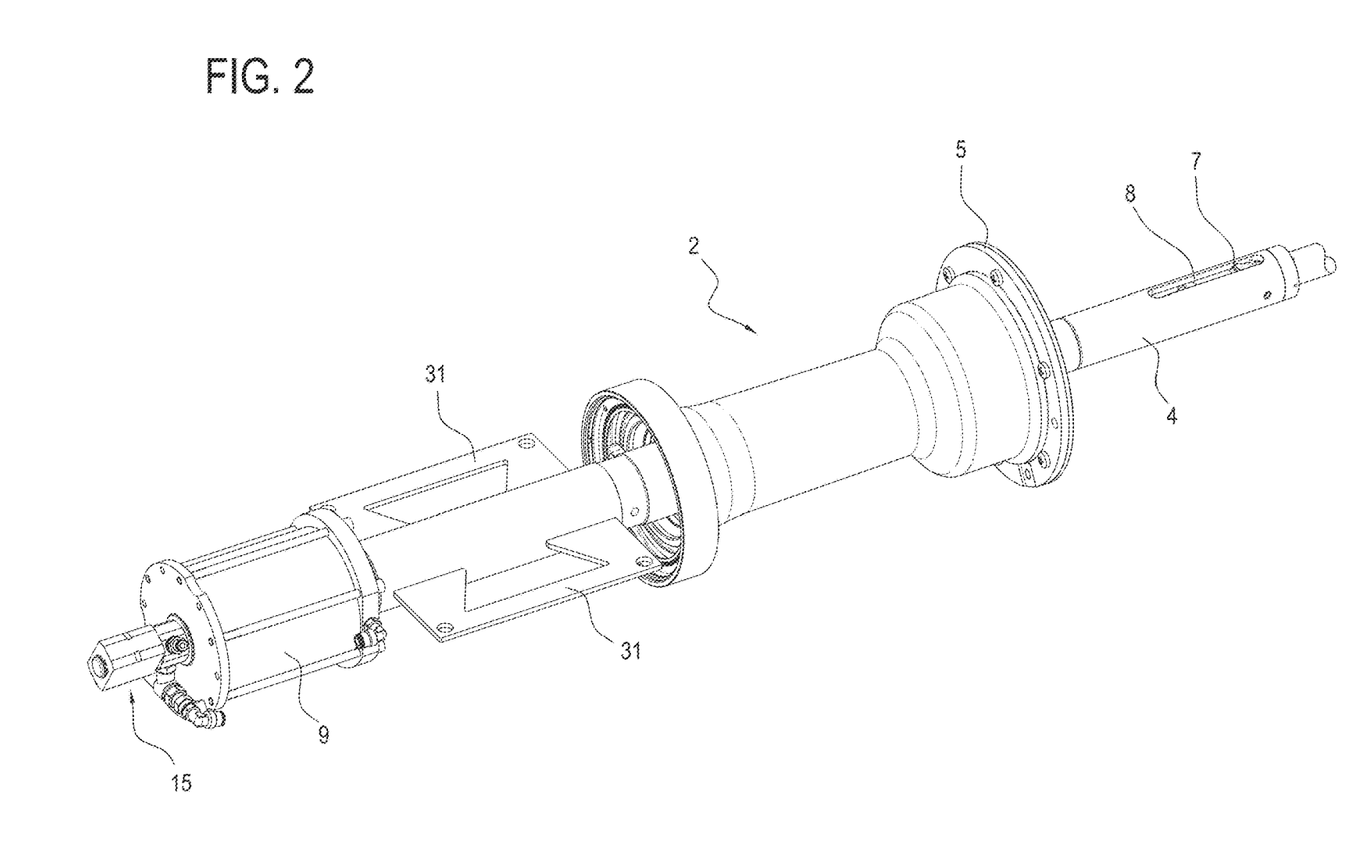
FIG. 2 shows a perspective view of a detail of the machine of this description.
Figure 3:
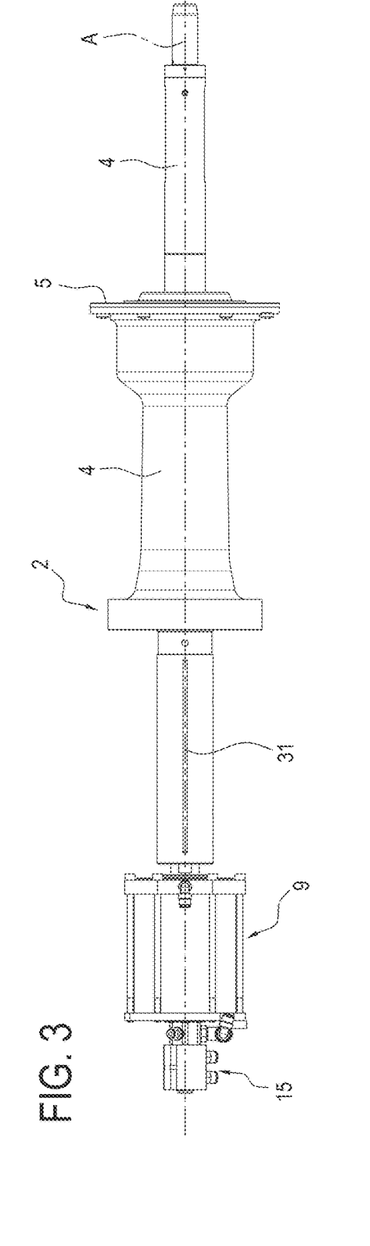
FIG. 3 is a side view of the detail of FIG. 2.

With reference to the accompanying drawings, the numeral 1 denotes a wheel service machine according to the invention. More specifically, the machine 1 of the example illustrated is a balancing machine.

The machine 1 comprises a rotary supporting unit 2 for supporting a vehicle wheel provided with a rim and a tire.

The machine 1 has a frame 3 to which the rotary supporting unit 2 is connected.

The rotary supporting unit 2 has a rotary shaft 4 which rotates about its longitudinal axis A.

In the example illustrated, the longitudinal axis of the shaft 4 is oriented horizontally, parallel to a supporting surface of a floor the machine 1 rests on.

The numeral 31 in the drawings denotes fixed elements which are integral with the frame 3 and rotatably coupled to the shaft 4 (for example, by means of bearings, not illustrated, of essentially known type) to support it in rotation.

In a different embodiment (not illustrated), relating for example to a tire changer machine, the shaft 4 (and more generally, the rotary supporting unit 2) is oriented vertically, perpendicularly to a supporting surface of a floor the machine 1 rests on.

The shaft 4 is connected to a drive unit (not illustrated, consisting, for example, of an electric motor) designed to rotate the shaft 4 about the longitudinal axis A.

Figure 4:
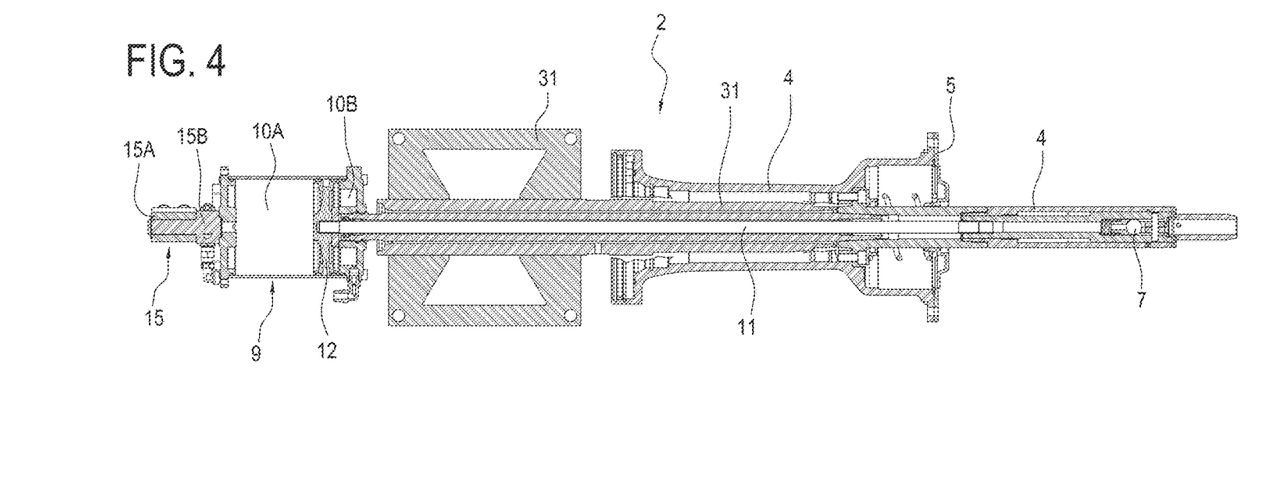
FIG. 4 illustrates the detail of FIG. 2 in cross section.
Figure 5:
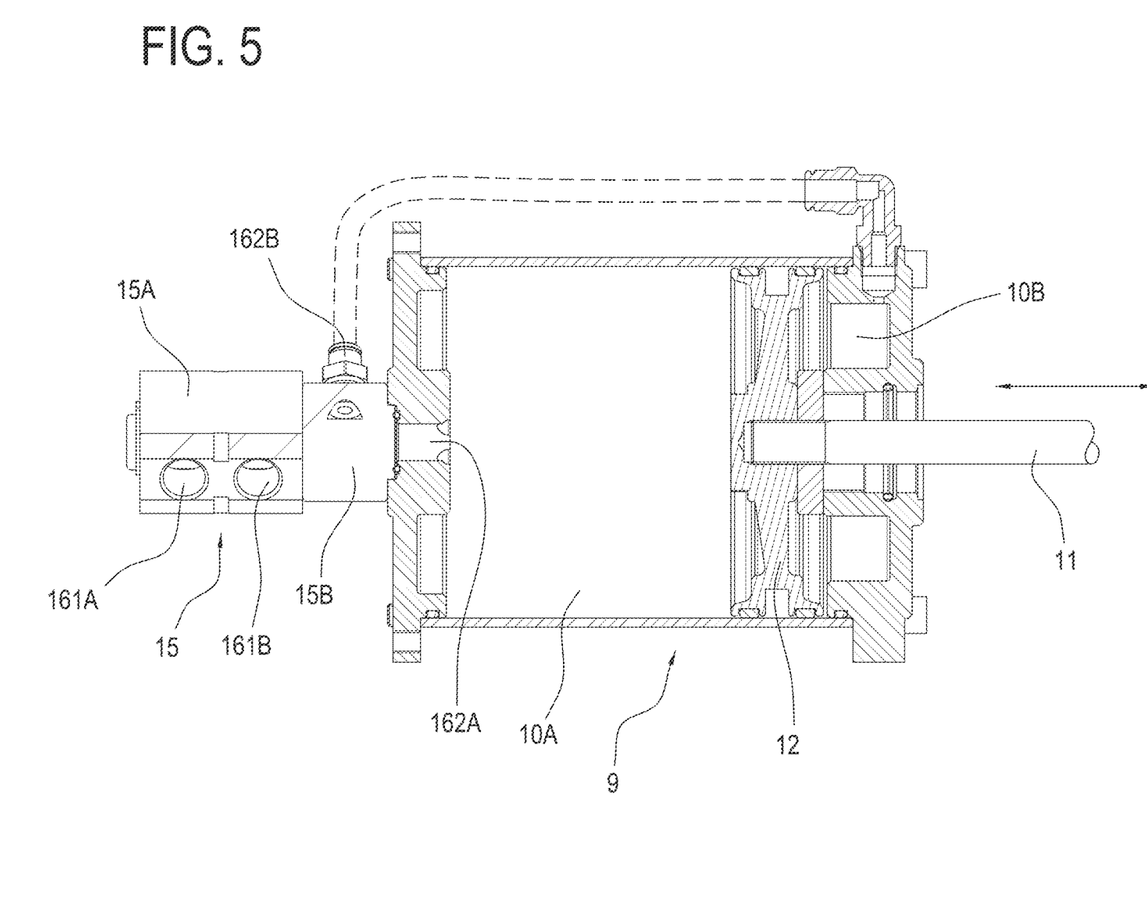
FIG. 5 illustrates an enlarged portion of the detail of FIG. 4.

The machine 1 (the rotary supporting unit 2) comprises an abutment element 5, connected to the shaft to rotate as one therewith and designed to come into abutment with the rim supported by the shaft. In the example illustrated, the abutment element 5 is a radial flange.

The machine 1 (the rotary supporting unit 2) also comprises a locking member 6. The locking member 6 is designed to be removably coupled to the shaft 4 and is configured to slide relative to the shaft 4 along the longitudinal axis A.

More specifically, the locking member 6 is movable between a locked position, where it is close to the abutment element 5 in order to lock the rim, interposed between the abutment element 5 and the locking member 6 itself, and an unlocked position, away from the abutment element 5 and not interfering with the rim.

In the example illustrated, the locking member 6 is a sleeve, preferably provided with a conical portion designed to interact with a perforated portion of the rim.

The machine 1 (the rotary supporting unit 2) also comprises an engagement element 7 which is movably connected to the shaft 4 to move parallel with the longitudinal axis A. The engagement element 7 is configured to be coupled to the locking member 6 so as to drive the latter in motion longitudinally towards the abutment element 5.

In the example illustrated, the engagement element 7 has a tooth which is slidable along a groove 8 formed in the shaft 4. The tooth is also movable radially to protrude from the outer periphery of the shaft 4 and engage the locking member 6.

The machine 1 also comprises an actuator 9 designed to move the engagement element 7. The actuator 9 is a pneumatic actuator.

In the example illustrated, the actuator 9 is connected to the shaft 4 and forms part of the rotary supporting unit 2.

Figure 6:
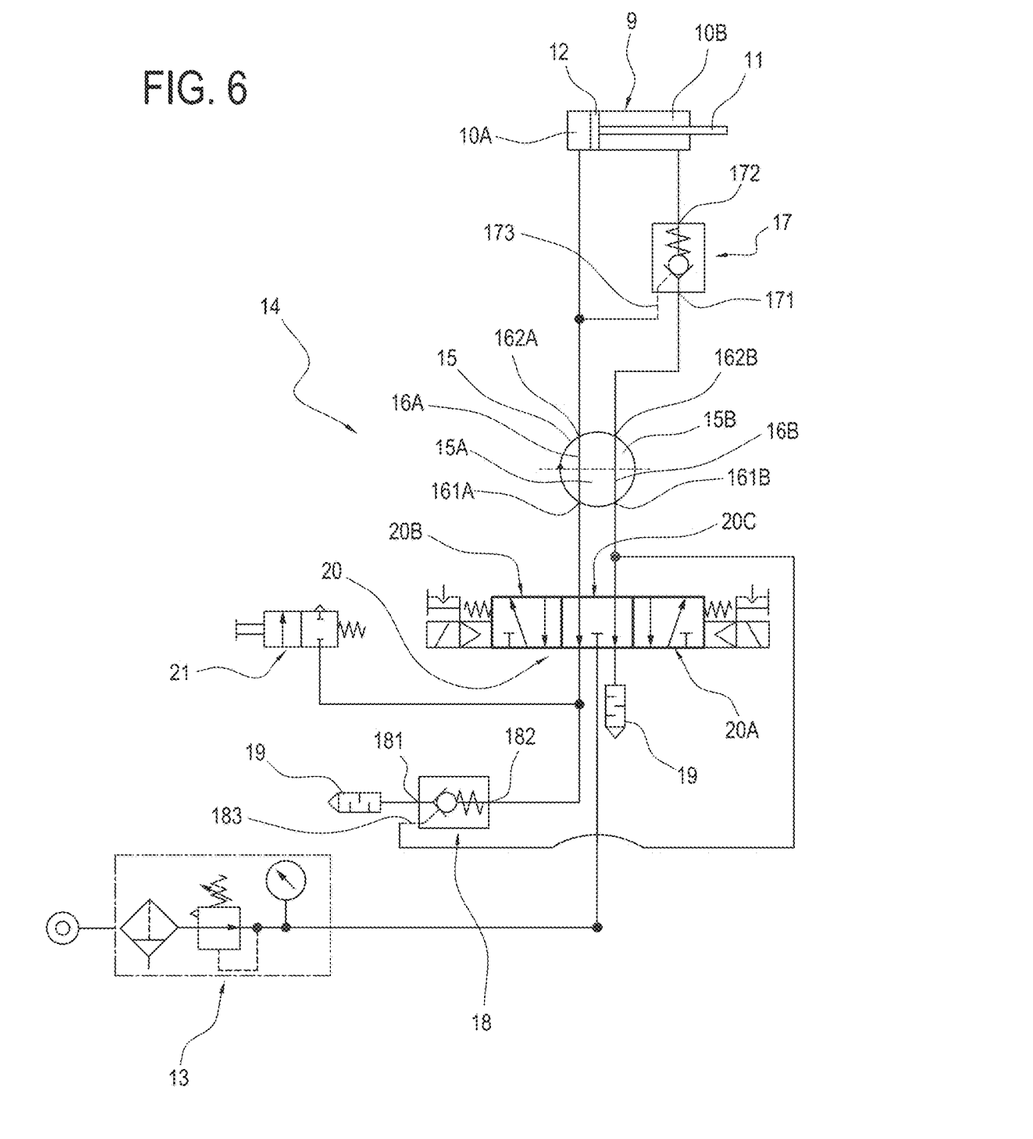
FIG. 6 schematically illustrates a pneumatic circuit of the machine of FIG. 1.

The pneumatic actuator 9 has a first chamber 10A and a second chamber 10B.

The pneumatic actuator 9 is integral with the shaft 4 to rotate as one therewith.

The pneumatic actuator 9 is connected to the engagement element 6 to move the latter between the locked and unlocked positions. In the example illustrated, the pneumatic actuator 9 is connected to the engagement element 6 by means of a stem 11. The stem 11 is located inside a cavity of the shaft 4 and is slidable therein along the longitudinal axis A.

The pneumatic actuator 9 comprises a partition 12 configured to fluid-sealedly separate the first chamber 10A from the second chamber 10B. The partition 12 is connected to the stem 11.

The machine 1 also comprises a high-pressure source 13 of a fluid (gas or liquid), for example, air under pressure.

The machine 1 also comprises a pneumatic circuit 14 configured to selectively connect the first chamber 10A and the second chamber 10B of the pneumatic actuator 9 to the high-pressure source 13.

The pneumatic circuit 14 includes a rotary manifold 15.

The rotary manifold 15 has a stationary part 15A and a rotating part 15B.

The rotary manifold 15 internally defines at least a first duct 16A and a second duct 16B.

The first duct 16A of the rotary manifold 15 has an inlet 161A in the stationary part 15A and an outlet 162A in the rotating part.

The second duct 16B of the rotary manifold 15 has an inlet 161B in the stationary part 15A and an outlet 162B in the rotating part.

The outlet 162A of the first duct 16A is connected to the first chamber 10A of the pneumatic actuator 9. The outlet 162B of the second duct 16B is connected to the second chamber 10B of the pneumatic actuator 9.

The inlets 161A, 161B of the first and second ducts 16A, 16B can be connected selectively to the high-pressure source 13.

The pneumatic circuit 14 comprises (at least) a first retaining valve 17. The retaining valve 17 is a valve configured to interrupt fluid communication in the stretch of the duct it is mounted in, thereby creating a duct stretch upstream of the valve and a duct stretch downstream of the valve, where the upstream and downstream stretches may have different pressures.

The retaining valve 17 is located between the second chamber 10B of the pneumatic actuator 9 and the outlet 162B of the second duct 16B of the rotary manifold 15. The retaining valve 17 is configured to determine, in at least one operating configuration of the pneumatic circuit 14, a difference in pressure between the second chamber 10B of the pneumatic actuator 9 and the second duct 16B of the rotary manifold 15.

In the example illustrated, the retaining valve 17 is a one-way valve. More specifically, the retaining valve 17 has an inlet 171 and an outlet 172 and is open when the pressure at the inlet 171 is higher than the pressure at the outlet 172 and is normally closed when the pressure at the inlet is lower than the pressure at the outlet (by an amount exceeding a predetermined calibration value).

In the example illustrated, the retaining valve 17 can be forcedly activated, that is, opened (it is a controlled valve), for example through an activation duct 173. More specifically, when the activation duct 173 is under high pressure, the retaining valve 17 is forced to be opened, even if the pressure at the inlet 171 is lower than it is at the outlet 172.

In the example illustrated, the activation duct 173 of the first retaining valve 17 is connected to the outlet 162A of the first duct 16A of the rotary manifold 15.

In the example illustrated, the pneumatic circuit 14 comprises a second retaining valve 18, located between the inlet 161A of the first duct 16A of the rotary manifold 15 and an environment 19 at low pressure (for example, the outside environment).

In the example illustrated, the second retaining valve 18 is a one-way valve. More specifically, the second retaining valve 18 has an inlet 181 and an outlet 182 and is open when the pressure at the inlet 181 is higher than the pressure at the outlet 182 and is normally closed when the pressure at the inlet is lower than the pressure at the outlet (by an amount exceeding a predetermined calibration value).

In the example illustrated, the second retaining valve 18 can be forcedly activated, that is, opened (it is a controlled valve), for example through a respective (second) activation duct 183. More specifically, when the activation duct 183 is under high pressure, the second retaining valve 18 is forced to be opened, even if the pressure at the inlet 181 is lower than it is at the outlet 182.

In the example illustrated, the activation duct 183 of the second retaining valve 18 is connected to the inlet 161B of the second duct 16B of the rotary manifold 15.

In the example illustrated, the pneumatic circuit comprises an electrovalve 20. The electrovalve 20 is operatively interposed between the high-pressure source 13 and the inlets 161A, 161B of the rotary manifold 15.

The electrovalve 20 can be driven between at least a first, a second and a third operating configuration.

The electrovalve 20 comprises a first module 20A, a second module 20B and a third module 20C. The electrovalve is movable, for example under the action of an electric actuator (for example a relay) between a first position, where the first module 20A is aligned and in fluid communication with the inlets 161A, 161B of the rotary manifold 15 and the electrovalve 20 is in the first configuration, a second position, where the second module 20B is aligned and in fluid communication with the inlets 161A, 161B of the rotary manifold 15 and the electrovalve 20 is in the second configuration, and a third position, where the third module 20C is aligned and in fluid communication with the inlets 161A, 161B of the rotary manifold 15 and the electrovalve 20 is in the third configuration.

In the first operating configuration, the electrovalve 20 places in fluid communication the first duct 16A of the rotary manifold 15 with the low-pressure environment 19 and the second duct 16B of the rotary manifold 15 with the high-pressure source 13.

In the second operating configuration, the electrovalve 20 places in fluid communication the first duct 16A of the rotary manifold 15 with the high-pressure source 13 and the second duct 16B of the rotary manifold 15 with the low-pressure environment 19.

In the third operating configuration, the electrovalve 20 places the first duct 16A and the second duct 16B of the rotary manifold 15 in fluid communication with the low-pressure environment 19.

In the example illustrated, the pneumatic circuit 14 comprises a relief valve 21. The relief valve 21 is connected to the first duct 16A of the rotary manifold 15. In the example illustrated, the relief valve 21 is connected to the electrovalve 20 and operatively in fluid communication with the first duct 16A of the rotary manifold 15, when the electrovalve 20 is in the third operating configuration.

The first retaining valve 17 rotates as one with the shaft 4. Preferably, the first retaining valve 17 has its outlet 172 connected to the second chamber 10B of the pneumatic actuator 10 and an inlet 171 connected selectively and alternately: to the high-pressure source 13 when the electrovalve 20 is in the first operating configuration; to the low-pressure environment 19 when the electrovalve 20 is in the second and third operating configurations.

The second retaining valve 18 is stationary relative to the rotary shaft 4. The inlet 181 of the second retaining valve 18 is connected to the low-pressure environment 19; the outlet 182 is selectively and alternately: connected to the first duct 16A of the rotary manifold 15, when the electrovalve 20 is in the first and third operating configurations; disconnected from the rotary manifold 15, when the electrovalve 20 is in the second operating configuration.

This description also provides a method for using a wheel service machine 1, in particular, a balancing machine (or a tire changer). The wheel service machine 1 allows operations to be carried out on the wheel.

The method comprises the following steps: coupling the rim to the shaft 4 (when the shaft is stopped, that is, stationary); coupling a locking member 6 to the shaft 4 in such a way that the rim is interposed between the locking member 6 and abutment element 5 which is integral with the shaft 4 and designed to come into abutment with the rim; and automatically locking the wheel to the shaft 4.

The wheel is locked to the shaft 4 by moving an engagement element 7 longitudinally along the shaft 4; the engagement element 7 thus engages the locking member 6 and drives it towards the abutment element 5 in such a way as to lock the rim against the abutment element 5 itself.

The movement of the engagement element 7 is determined by the pneumatic actuator 9, which is integral with the shaft 4 and connected to the rotary manifold 15.

The method also comprises the following steps: setting in rotation the shaft and the wheel locked thereto; carrying out the operations on the wheel; and stopping the rotation of the shaft.

During wheel service operations, the wheel remains locked to the shaft 4 and, according to this description, while the shaft 4 is stationary, the first and second ducts 16A, 16B of the rotary manifold 15 are placed in fluid communication with the low-pressure environment 19 and with the high-pressure source 13, respectively, so that a condition of overpressure is created in the second chamber 10B of the pneumatic actuator 9 relative to the first chamber 10A. This causes the wheel to be locked to the shaft 4.

Next, the second duct 16B of the rotary manifold 15 is connected to the low-pressure environment 19 and high pressure is maintained inside the second chamber 10B of the pneumatic actuator 9, for example by means of a first retaining valve 17 located between the second chamber 10B of the pneumatic actuator 9 and the outlet 162B of the second duct 16B of the rotary manifold 15. After that, the shaft is made to start rotating. This condition is maintained during rotation of the shaft 4.

In an example embodiment, the method comprises a step of unlocking the wheel from the shaft 4 by connecting the first duct 16A of the rotary manifold 15 to the high-pressure source 13, connecting the second duct 16B of the rotary manifold 15 to the low-pressure environment 19 and forcing the retaining valve 17 to be activated and opened.

In an example embodiment, the method comprises moving an electrovalve 20, which is operatively interposed between the inlets 161A, 161B of the rotary manifold 15 and the high-pressure source 13 (and the low-pressure environment 19), between at least a first, a second and a third operating configuration.

What is claimed is:

1. A wheel service machine to carry out operations on a wheel having a rim and a tire, the wheel service machine comprising:
    a shaft connected to a drive motor unit to rotate about a longitudinal axis and designed to support the wheel in rotation;
    an abutment element, connected to the shaft to rotate as one therewith and designed to come into abutment with the rim supported by the shaft;
    a locking member, designed to be removably coupled to the shaft and configured to slide relative to the shaft along the axis between a locked position, where it is close to the abutment element in order to lock the rim, interposed between the abutment element and the locking member itself, and an unlocked position, away from the abutment element and not interfering with the rim;
    an engagement element movably connected to the shaft to move parallel with the longitudinal axis and configured to be coupled to the locking member so as to drive the latter in motion;
    a pneumatic actuator having a first and a second chamber connected to shaft to rotate as one therewith and connected to the engagement element to move it between the locked position and the unlocked position;
a high-pressure source; and
a pneumatic circuit configured to selectively connect the first and second chambers of the pneumatic actuator to the high-pressure source, wherein the pneumatic circuit includes a rotary manifold having a stationary part and a rotating part and defining at least a first and a second duct, each having an inlet in the stationary part and an outlet in the rotating part, wherein the outlets of the first and the second duct are connected to the first and the second chamber of the pneumatic actuator, respectively, and the inlets of the first and the second duct are selectively connectable to the high-pressure source,
wherein the pneumatic circuit comprises at least a first retaining valve, located between the second chamber of the pneumatic actuator and the outlet of the second duct of the rotary manifold and configured to determine, in at least one operating configuration of the pneumatic circuit, a difference in pressure between the second chamber of the pneumatic actuator and the second duct of the rotary manifold.

2. The wheel service machine according to claim 1, wherein the at least one first retaining valve has an inlet and an outlet and is open when the pressure at the inlet is higher than the pressure at the outlet, and is normally closed when the pressure at the inlet is lower than the pressure at the outlet, and can be forcedly activated to open, wherein the pneumatic circuit comprises an activation duct connected to the at least one first retaining valve to force the latter to be activated.

3. The wheel service machine according to claim 2, wherein the activation duct of the at least one first retaining valve is connected to the outlet of the first duct of the rotary manifold.

4. The wheel service machine according to claim 1, wherein the pneumatic circuit comprises a second retaining valve located between the inlet of the first duct of the rotary manifold and a low-pressure environment.

5. The wheel service machine according to claim 4, wherein the second retaining valve has an inlet and an outlet and is open when the pressure at the inlet is higher than the pressure at the outlet, and is normally closed when the pressure at the inlet is lower than the pressure at the outlet, and can be forcedly activated to open, wherein the pneumatic circuit comprises an activation duct connected to the second retaining valve to force the latter to be activated.

6. The wheel service machine according to claim 5, wherein the activation duct of the second retaining valve is connected to the inlet of the second duct of the rotary manifold.

7. The wheel service machine according to claim 1, wherein the pneumatic circuit comprises an electrovalve, which is operatively interposed between the high-pressure source and the inlets of the rotary manifold and which can be driven between the following operating configurations:
a first operating configuration, wherein it places in fluid communication the first duct of the rotary manifold with a low-pressure environment and the second duct of the rotary manifold with the high-pressure source;
a second operating configuration, wherein it places in fluid communication the first duct of the rotary manifold with the high-pressure source and the second duct of the rotary manifold with the low-pressure environment;
a third operating configuration, wherein it places the first and the second duct of the rotary manifold in fluid communication with the low-pressure environment.

8. The wheel service machine according to claim 7, wherein the pneumatic circuit comprises a relief valve connected to the electrovalve and operatively in fluid communication with the first duct of the rotary manifold, when the electrovalve is in the third operating configuration.

9. The wheel service machine according to claim 7, wherein the at least one first retaining valve rotates as one with the shaft and has an outlet which is connected to the second chamber of the pneumatic actuator and an inlet which is connected, selectively and alternately:
to the high-pressure source when the electrovalve is in the first operating configuration;
to the low-pressure environment when the electrovalve is in the second and third operating configurations.

10. The wheel service machine according to claim 7, wherein the pneumatic circuit comprises a second retaining valve, which is stationary relative to the rotary shaft and which has an inlet connected to the low-pressure environment, wherein an outlet of the second retaining valve is, selectively and alternately:
connected to the first duct of the rotary manifold, when the electrovalve is in the first and third operating configurations;
disconnected from the rotary manifold, when the electrovalve is in the second operating configuration.

11. A method for using a wheel service machine to allow operations to be carried out on a wheel having a rim and a tire, comprising the following steps:
coupling the rim to a shaft;
coupling a locking member to the shaft in such a way that the rim is interposed between the locking member and the abutment element which is integral with the shaft and designed to come into abutment with the rim;
locking the wheel to the shaft by moving an engagement element longitudinally along the shaft, thereby engaging the locking member and locking the rim against the abutment element, wherein the movement of the engagement element is determined by a pneumatic actuator integral with the shaft and connected to a rotary manifold having a stationary part and a rotary part and defining at least a first and a second duct, each having an inlet in the stationary part and an outlet in the rotating part, wherein the outlets of the first and the second duct are connected to the first and the second chamber of the pneumatic actuator, respectively, and the inlets of the first and the second duct of the rotary manifold are selectively connectable to a high-pressure source;
setting in rotation the shaft and the wheel locked thereto;
carrying out operations on the wheel; and
stopping the shaft from rotating,
wherein the step of locking the wheel comprises the following steps:
with the shaft stopped, placing the first and the second duct of the rotary manifold in fluid communication with a low-pressure environment and with the high-pressure source, respectively, so as to create a condition of overpressure in the second chamber of the pneumatic actuator relative to the first chamber; and
next, connecting the second duct of the rotary manifold to the low-pressure environment and keeping the second chamber of the pneumatic actuator under high pressure by means of at least one first retaining valve positioned between the second chamber of the pneumatic actuator and the outlet of the second duct of the rotary manifold, wherein the shaft is made to start rotating after the connecting step.

12. The method according to claim 11, comprising a step of unlocking by connecting the first duct of the rotary manifold to the high-pressure source, connecting the second duct of the rotary manifold to the low-pressure environment and forcedly activating and opening the retaining valve.

13. The method according to claim 12, comprising a step of moving an electrovalve which is operatively interposed between the inlets of the rotary manifold and the high-pressure source, between
- a first operating configuration, wherein the electrovalve places in fluid communication the first duct of the rotary manifold with the low-pressure environment and the second duct of the rotary manifold with the high-pressure source;
- a second operating configuration, wherein the electrovalve places in fluid communication the first duct of the rotary manifold with the high-pressure source and the second duct of the rotary manifold with the low-pressure environment;
- a third operating configuration, wherein the electrovalve places the first and the second duct of the rotary manifold in fluid communication with the low-pressure environment.

\* \* \* \* \*

UNITED STATES PATENT AND TRADEMARK OFFICE
CERTIFICATE OF CORRECTION

PATENT NO. : 10,006,830 B2
APPLICATION NO. : 15/153539
DATED : June 26, 2018
INVENTOR(S) : Giulio Corghi It is certified that error appears in the above-identified patent and that said Letters Patent is hereby corrected as shown below:

On the Title Page

Please amend (73) Assignee as follows:
Delete "NEXION S.P.A." and replace with -- NEXION S.p.A. --

Please add:
-- (30) Foreign Application Priority Data
May 20, 2015 (IT) .................................. 102015000016110 --

Signed and Sealed this
Twenty-eighth Day of August, 2018

Andrei Iancu
*Director of the United States Patent and Trademark Office*